US009487228B2

(12) United States Patent
Fevre et al.

(10) Patent No.: US 9,487,228 B2
(45) Date of Patent: Nov. 8, 2016

(54) DEVICE FOR STOWING A STEERING COLUMN

(71) Applicant: ROBERT BOSCH AUTOMOTIVE STEERING VENDOME, Vendôme (FR)

(72) Inventors: Laurent Fevre, Saint Sulpice (FR); Mickael Sauquet, Villerable (FR)

(73) Assignee: ROBERT BOSCH AUTOMOTIVE STEERING VENDOME, Vendôme (FR)

( * ) Notice: Subject to any disclaimer, the term of this patent is extended or adjusted under 35 U.S.C. 154(b) by 0 days.

(21) Appl. No.: 14/765,827

(22) PCT Filed: Dec. 19, 2013

(86) PCT No.: PCT/FR2013/053205
§ 371 (c)(1),
(2) Date: Aug. 4, 2015

(87) PCT Pub. No.: WO2014/125174
PCT Pub. Date: Aug. 21, 2014

(65) Prior Publication Data
US 2015/0375768 A1      Dec. 31, 2015

(30) Foreign Application Priority Data

Feb. 12, 2013  (FR) .................................... 13 51197
Feb. 15, 2013  (FR) .................................... 13 51340

(51) Int. Cl.
*B62D 1/181*           (2006.01)
(52) U.S. Cl.
CPC .................................... *B62D 1/181* (2013.01)
(58) Field of Classification Search
CPC .............................. B62D 1/181; B62D 1/187

USPC ............................................ 280/775; 74/493
See application file for complete search history.

(56) References Cited

U.S. PATENT DOCUMENTS

| 4,503,504 A * | 3/1985 | Suzumura ................. B60R 1/07 |
| | | 280/775 |
| 6,390,505 B1 | 5/2002 | Wilson |
| 2002/0124677 A1* | 9/2002 | Tomaru ................. B62D 1/181 |
| | | 74/493 |
| 2003/0192392 A1* | 10/2003 | Gaeth .................... B62D 1/181 |
| | | 74/493 |

(Continued)

FOREIGN PATENT DOCUMENTS

| CN | 201534560 | 7/2010 |
| DE | 10 2008 054310 A1 | 6/2010 |

(Continued)

OTHER PUBLICATIONS

International Search Report with English translation for International Application No. PCT/FR2013/053205, 6 pages, mailed Apr. 4, 2014.

(Continued)

*Primary Examiner* — Darlene Condra
(74) *Attorney, Agent, or Firm* — Patterson Thuente Pedersen, P.A.

(57) ABSTRACT

The steering column having a lug, a casing, an inner tube, an outer tube, a steering wheel end-piece, and at least one adjustment gear motor. The lug is axially movable and the column includes a gear motor controlling the lug. Having a movable lug makes it possible to increase the stowing length of the steering wheel. The range of movement is the sum of the movements of the lug and the adjustment gear motor.

17 Claims, 7 Drawing Sheets

(56) References Cited

U.S. PATENT DOCUMENTS

| | | | | |
|---|---|---|---|---|
| 2007/0008083 A1* | 1/2007 | Berg | ............... | B60K 28/066 340/425.5 |
| 2008/0178701 A1* | 7/2008 | Kim | ............... | B62D 1/184 74/493 |
| 2008/0216597 A1* | 9/2008 | Iwakawa | ............... | B62D 1/181 74/493 |
| 2012/0247259 A1* | 10/2012 | Mizuno | ............... | B62D 1/181 74/493 |
| 2013/0074639 A1* | 3/2013 | Toyoda | ............... | B62D 1/185 74/493 |
| 2013/0110353 A1* | 5/2013 | Tanaka | ............... | B62D 1/181 701/44 |

FOREIGN PATENT DOCUMENTS

| | | |
|---|---|---|
| EP | 1733950 A1 | 12/2006 |
| JP | 2009262596 | 11/2009 |

OTHER PUBLICATIONS

Chinese Office Action for Chinese Application No. 201380072482.5 dated Aug. 15, 2016, English translation not provided.

* cited by examiner

DEVICE FOR STOWING A STEERING COLUMN

RELATED APPLICATIONS

The present application is a National Phase entry of PCT Application No. PCT/FR2013/053205, filed Dec. 19, 2013, which claims priority to FR 1351197, filed Feb. 12, 2013 and claims priority to FR 1351340, filed Feb. 15, 2013, the contents of each being incorporated herein by reference in their entireties.

TECHNICAL FIELD

The present invention relates to a motor vehicle steering column. In particular, when a driver gets into a car he or she may be hampered in seating himself or herself because of the steering wheel positioned in front of the seat. It is possible to stow the steering wheel and leave the driver space to sit down.

BACKGROUND ART

The steering column that allows the position of the steering wheel to be adjusted in order to improve the ergonomics of the driving position also in some cases allows the steering wheel to be brought into a specific position that makes it easier for the driver to get out of or into the vehicle: this is the stowing function. The greater the stowing travel the more advantageous it will be to the user, and the more it will assist in the process of access to the seat.

In order to perform this stowing function, known devices use a function whereby the steering wheel can be adjusted axially, which may sometimes be combined with a function whereby the steering wheel can be adjusted vertically. Each function uses a specific motor.

However, axial adjustment of the steering wheel is performed at a relatively low speed in order to enable the steering wheel to be positioned accurately when the driver is adjusting the reach of the steering wheel. The stowing speed is identical to the steering wheel adjustment speed and this means that the stowing function requires a long execution time especially if the stowing travel is greater than the travel allowed for adjusting the position of the steering wheel.

SUMMARY OF THE INVENTION

It is an object of the present invention to propose a steering wheel that allows greater and quicker stowing of the steering wheel.

The steering column according to the invention comprises a leg, a fairing, an inner tube, an outer tube, a steering wheel stub and at least one adjustment geared motor unit; it is characterized in that the leg is axially mobile and in that the column comprises a geared motor unit operating the leg. Having a mobile leg means that the stowing length of the steering wheel can be increased because the excursion is the sum of the movements of the leg and of the adjustment geared motor unit, whereas in the prior art only the outer tube is mobile translationally or vertically. The geared motor units may be electrical.

According to embodiments, the outer tube is axially mobile and an axial adjustment geared motor unit operates the outer tube. The excursion of the steering wheel is therefore the sum of the translational movement of the leg and of the outer tube.

According to, the column can be inclined and a vertical adjustment geared motor unit controls the rake of the column. The excursion of the steering wheel is then the sum of the translational movement of the leg and of the outer tube and the inclination of the steering column.

According to one particular arrangement, a control device actuates the geared motor units. The geared motor units are actuated by one and the same control device. The control device can be adjusted so as to set the stowing function in motion when the driver switches off the ignition of the vehicle and to return the steering wheel into its position when the ignition is switched back on.

According to another arrangement, the control device actuates all the geared motor units at the same time. By actuating simultaneously the steering wheel axial-adjustment motor, the column vertical adjustment motor and the stowing motor, the resultant speed for executing the steering wheel stowing function is increased.

According to an embodiment, the outer tube slides on the inner tube. The two, outer and inner, tubes are coaxial and enable the reach of the steering wheel to be adjusted.

According to an embodiment, the outer tube slides on the inner tube via a bushing. That makes it possible to limit friction forces and noise during axial adjustment of the steering wheel. It also allows a play-free connection between the tubes in order to have suitable stiffness.

According to an embodiment, the leg slides inside the fairing by means of a guide system made up of rails and of balls. This then offers the same advantages as a bushing for stowing of the steering wheel and also avoids any play between the components in order to achieve high stiffness. There is no influence with respect to lateral loadings.

According to an embodiment, the leg slides inside the fairing by friction. This solution is less expensive.

According to an embodiment, the axial adjustment geared motor unit is connected to the outer tube by a threaded rod. The threaded rod enables the driver fine adjustment of the steering wheel.

According to a an embodiment, the axial adjustment geared motor unit is fixed to the leg.

According to a an embodiment, the axial adjustment geared motor unit is fixed to the outer tube.

According to an embodiment, the stowing geared motor unit is fixed to the fairing.

According to an embodiment, the stowing geared motor unit is fixed to the leg.

According to an embodiment, the leg slides in the fairing with a vertical angle with respect to the movement of the outer tube. That means that the steering wheel can rise vertically at the same time as moving axially making it possible to free up more space for accessing the vehicle.

According to an embodiment, the leg slides in the fairing parallel to the movement of the outer tube. The system is more compact.

Other advantages may yet become apparent to a person skilled in the art from reading the examples hereinbelow, given by way of example, and illustrated by the attached figures.

DETAILED DESCRIPTION

Figure 1:
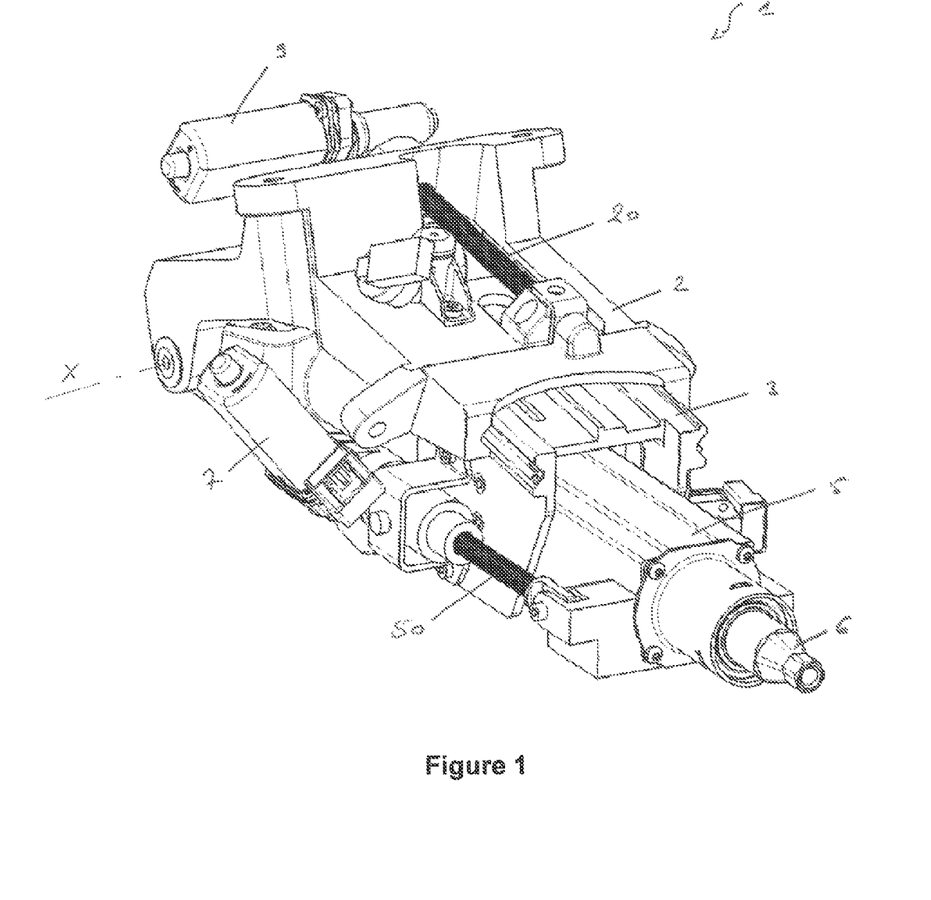
FIG. 1 is a perspective view of the steering column according to an embodiment of the invention.
Figure 2:
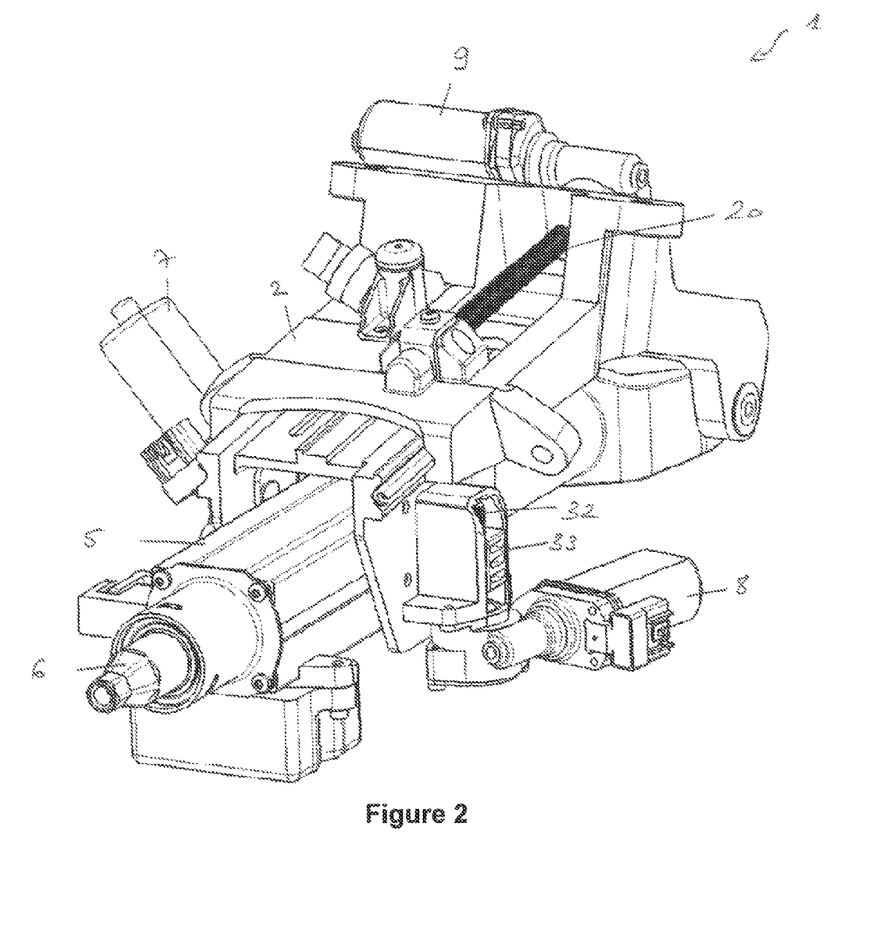
FIG. 2 is a perspective view from the opposite side with respect to FIG. 1.
Figure 3:
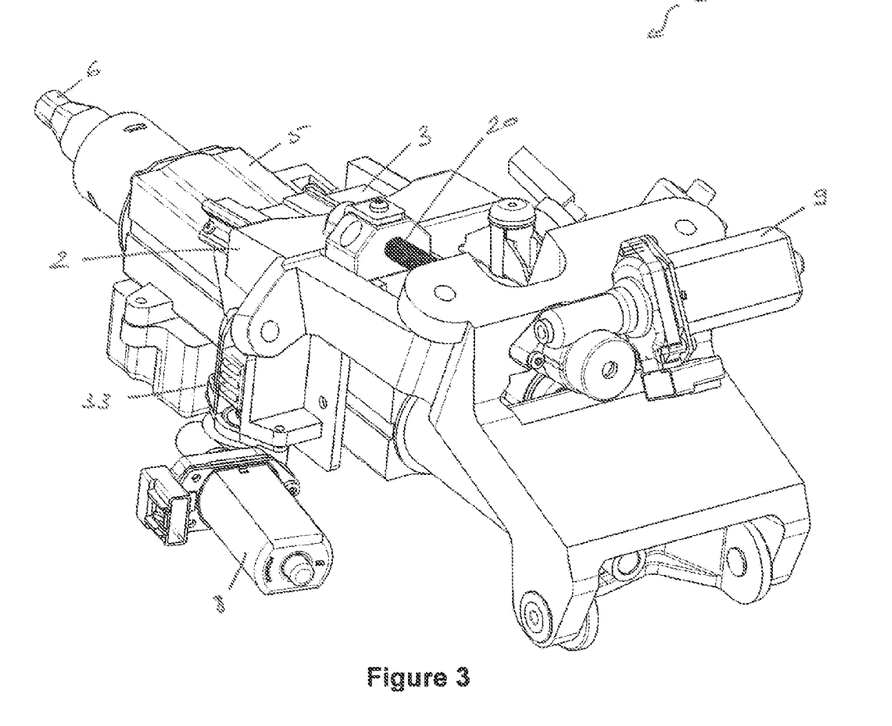
FIG. 3 is a perspective view of a steering column, viewed from the rear.

The steering column 1 illustrated in FIGS. 1, 2 and 3 comprises a fairing 2, a leg 3, an inner tube 4, an outer tube 5, a steering wheel stub 6, an axial adjustment geared motor unit 7, a vertical adjustment geared motor unit 8 and a geared motor unit 9. The steering wheel stub 6 is connected to the outer tube 5.

In FIG. 1, the axial adjustment geared motor unit 7 is fixed to the legs 3. A screw 50 is connected to the geared motor unit 7 and fixed to the outer tube 5. The action of the geared motor unit 7 causes the outer tube 5 to slide back and forth.

Figure 9:
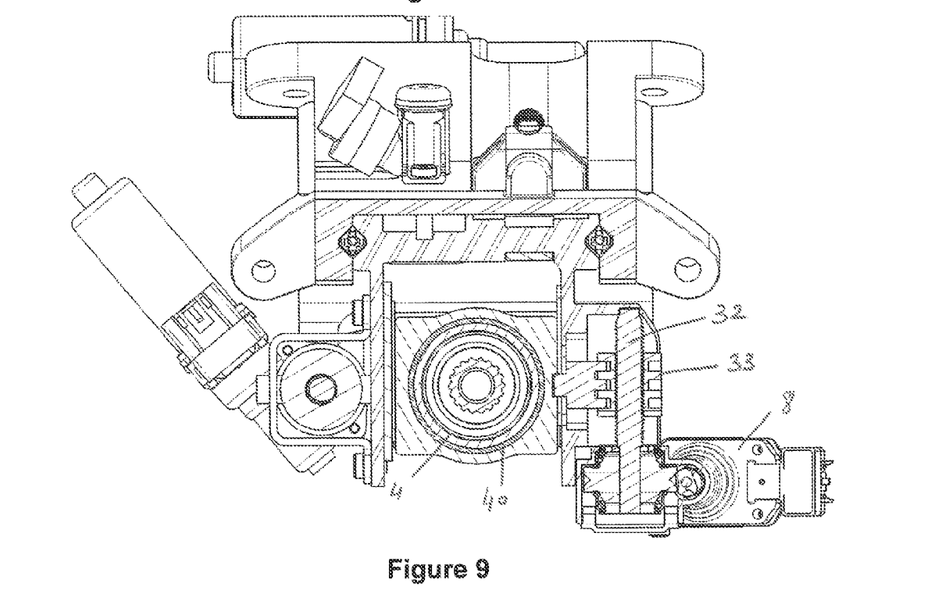
FIG. 9 is a sectional view, taken at a vertical stowage geared motor unit.
Figure 10:
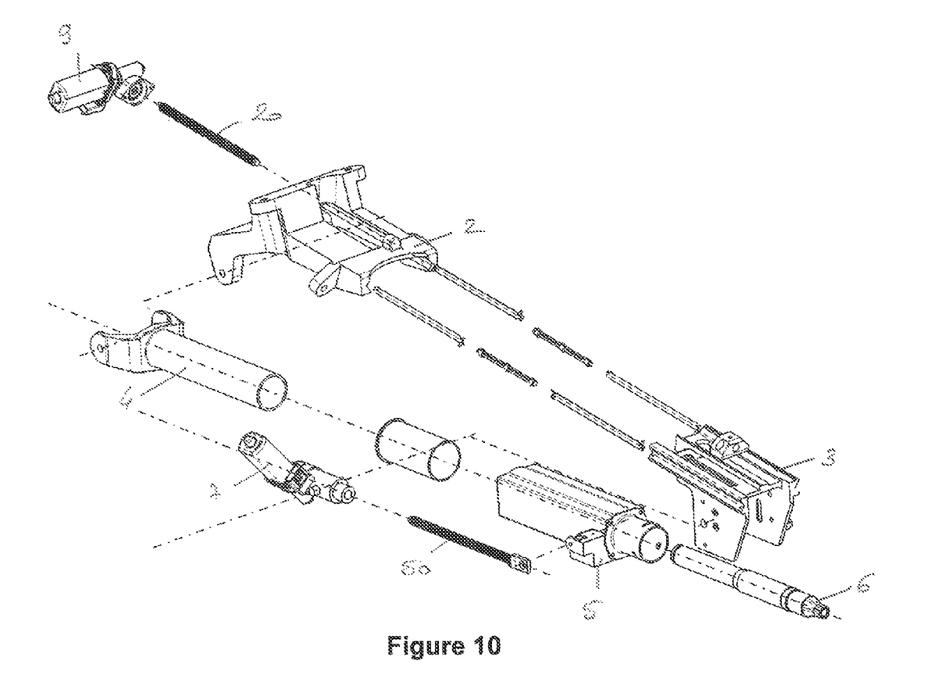
FIG. 10 is an exploded view of the steering column.

The vertical adjustment geared motor unit 8, illustrated in FIGS. 2 and 3, is fixed to the leg 3 and actuates a screw 32 which collaborates with a square nut 33 and allows the outer tube 5 to be oriented vertically (cf. FIG. 9).

In FIG. 1, the geared motor unit 9 is fixed to the fairing 2. A screw 20 is connected to the motor 9, fixed to the leg 3 and enables the steering wheel to be stowed.

The position of the steering wheel (not depicted) fixed on the steering wheel stub 6 can be adjusted by means of the geared motor units 7 and 9. During ergonomic adjustment of the steering wheel, the outer tube 5 slides on the inner tube 4 with an intermediate bushing 40 and the columns oriented vertically by a rotational movement about an axis X that is substantially horizontal with respect to the vehicle and perpendicular to the main axis of the column 1 The sliding between tube 4 and tube 5 can also take place without a bushing, with or without a surface coating.

Operation of the geared motor unit 7 enables the position of the steering wheel to be adjusted along the axis of the tubes 4 and 5. The voltage with which the geared motor unit 7 is powered provides control over the speed of this adjustment of the outer tube 5 on the inner tube 4: call this V1, directed axially or substantially horizontally.

Operation of the geared motor unit 8 enables the up and down position of the steering wheel to be adjusted. The voltage with which the geared motor unit 8 is powered allows the speed of the inclination of the steering wheel to be adjusted: call this V2, directed vertically.

Operation of the geared motor unit 9 enables the leg 3 to be slid in the fairing 2, at the same time driving the motor 7, the screw 50, the outer tube 5 and the steering wheel stub 6 in order to adjust the position of the steering wheel. The voltage with which the geared motor unit 9 is powered controls the speed of this adjustment: V3. This speed has a vertical component V3$v$ and a horizontal or axial component V3$h$.

Simultaneous operation of the geared motor units 7, 8 and 9 enables the position of the steering wheel to be adjusted. The speed of this movement is then a combination of the 3 individual speeds, namely V4, having a horizontal component V4$h$=V1+V3$h$ and a vertical component V4$v$=V2+V3$v$.

It is possible to plan for just one adjustment geared motor unit 7 or 8 to be actuated (rather than both 7 and 8) together with the geared motor unit 9; this will then give a V'4 that has two components:

V'4$h$=V3$h$ and V'4$v$=V2+V3$v$ or a V"4 with two components:

V"4$h$=V1+V3$h$ and V"4$v$=V3$v$.

Figure 4:
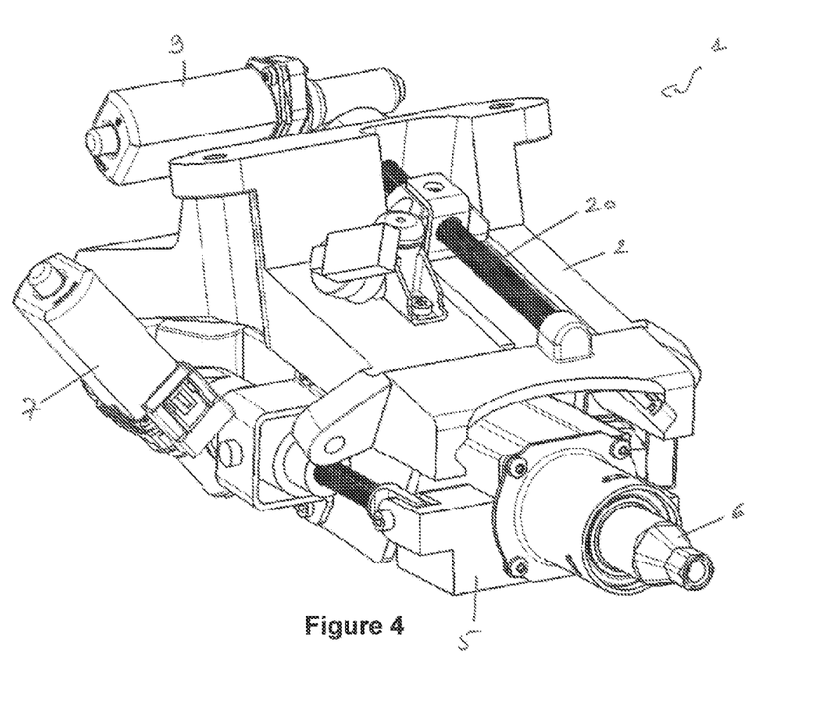
FIG. 4 is a perspective view of a steering column according to an embodiment of the invention, in the stowed position.
Figure 5:
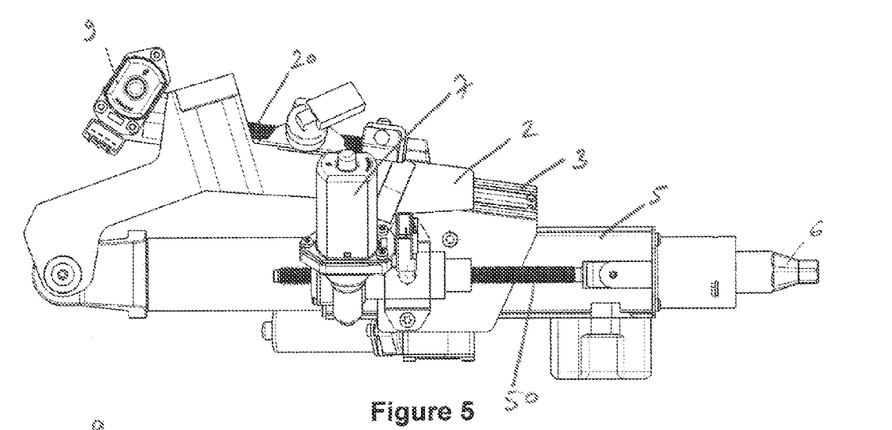
FIGS. 5, 6, and 7 are side views of a steering column in the deployed position, the retracted position and the stowed position.
Figure 6:
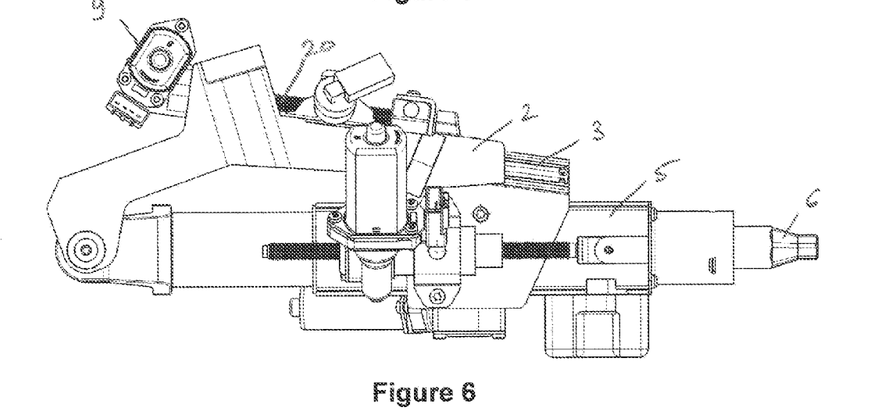
Figure 7:
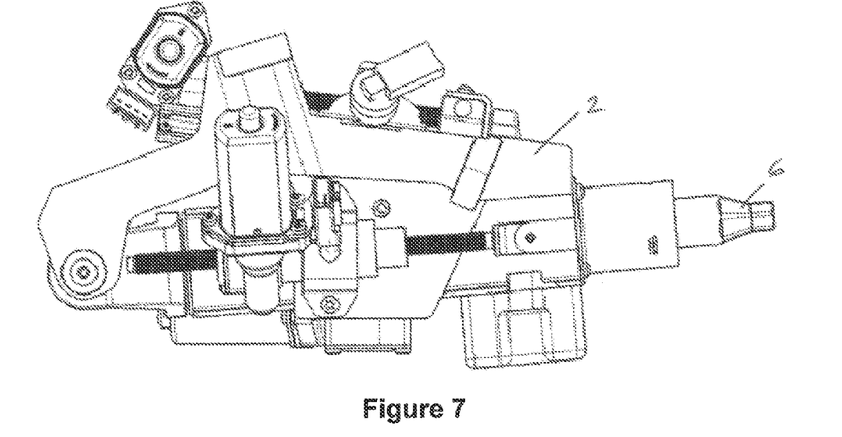
Figure 8:
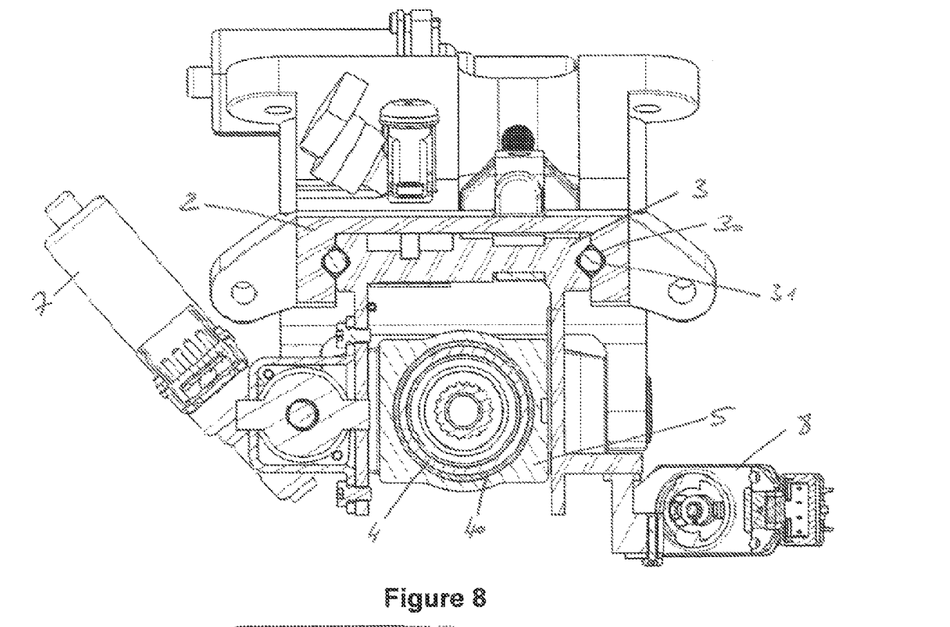
FIG. 8 is a sectional view, taken at the end of the fairing.

The stowage of the steering wheel will now be explained. The outer tube 5 slides on the inner tube 4 and the leg 3 slides inside the fairing 2 via a guide system made up of rails 30 and of balls 31 (FIG. 8). There may for example be two rows of 3 balls 31 and four rails 30. The ball system can be replaced by a friction system with or without a surface coating without departing from the scope of the present invention. The column 1 is then in a stowed position as illustrated in FIGS. 4 and 7.

The geared motor unit 8 that adjusts the inclination may be combined with the others to raise the steering wheel and thus free up even more space for accessing the driving seat.

Without departing from the scope of the present invention, it is possible to modify certain features, for example:
- to incorporate an energy absorption system between the fairing 2 and the leg 3,
- to have a direction of travel of the leg 3 and the fairing 2 parallel to the axes of the tubes 4 and 5 or alternatively in a specific direction,
- to plan that the vertical adjustment geared motor unit 8 for a vertical adjustment be fixed to the fairing 2 rather than the leg 3,
- to fix the geared motor unit 9 on the leg 3 rather than the fairing 2,
- to fix the axial adjustment geared motor unit 7 to the outer tube 5 rather than the leg 3,
- to provide guidance between the leg 3 and the fairing 2 which may be straight, curved or have any other specific profile.

The invention claimed is:

1. A steering column comprising a leg, a fairing, an inner tube, an outer tube, a steering wheel stub and a first axial adjustment geared motor unit, wherein the leg is axially mobile and the column comprises a second axial adjustment geared motor unit operating the leg.

2. The steering column as claimed in claim 1, wherein the outer tube is axially mobile and the first axial adjustment geared motor unit operates said outer tube.

3. The steering column as claimed in claim 1, wherein the column can be inclined and wherein a vertical adjustment geared motor unit controls the rake of said column.

4. The steering column as claimed in claim 1, wherein a control device actuates the axial adjustment geared motor units.

5. The steering column as claimed in claim 4, wherein the control device actuates all the geared motor units at the same time.

6. The steering column as claimed in claim 1, wherein the outer tube slides on the inner tube.

7. The steering column as claimed in claim 6, wherein the sliding of the outer tube on the inner tube takes place using a bushing.

8. The steering column as claimed in claim 1, wherein the leg slides inside the fairing by means of a guide system made up of rails and of balls.

9. The steering column as claimed in claim 8, wherein the leg slides inside the fairing by friction.

10. The steering column as claimed in claim 1, wherein the first axial adjustment geared motor unit is connected to the outer tube by a threaded screw.

11. The steering column as claimed in claim 1, wherein the first axial adjustment geared motor unit is fixed to the leg.

12. The steering column as claimed in claim 1, wherein the first axial adjustment geared motor unit is fixed to the outer tube.

13. The steering column as claimed in claim 1, wherein the second axial adjustment geared motor unit is fixed to the fairing.

14. The steering column as claimed in claim 1, wherein the second axial adjustment geared motor unit is fixed to the leg.

15. The steering column as claimed in claim 1, wherein the leg slides in the fairing with an angle with respect to the movement of the outer tube.

16. The steering column as claimed in claim 1, wherein the leg slides in the fairing parallel to the movement of the outer tube.

17. A steering column comprising a leg, a fairing, an inner tube, an outer tube, a steering wheel stub and one axial adjustment geared motor unit and one vertical adjustment geared motor unit, wherein the leg is axially mobile and the column comprises a second axial adjustment geared motor unit operating the leg.

* * * * *